No. 850,335. PATENTED APR. 16, 1907.
J. H. BAKER.
BRAKE BEAM.
APPLICATION FILED JULY 16, 1906.
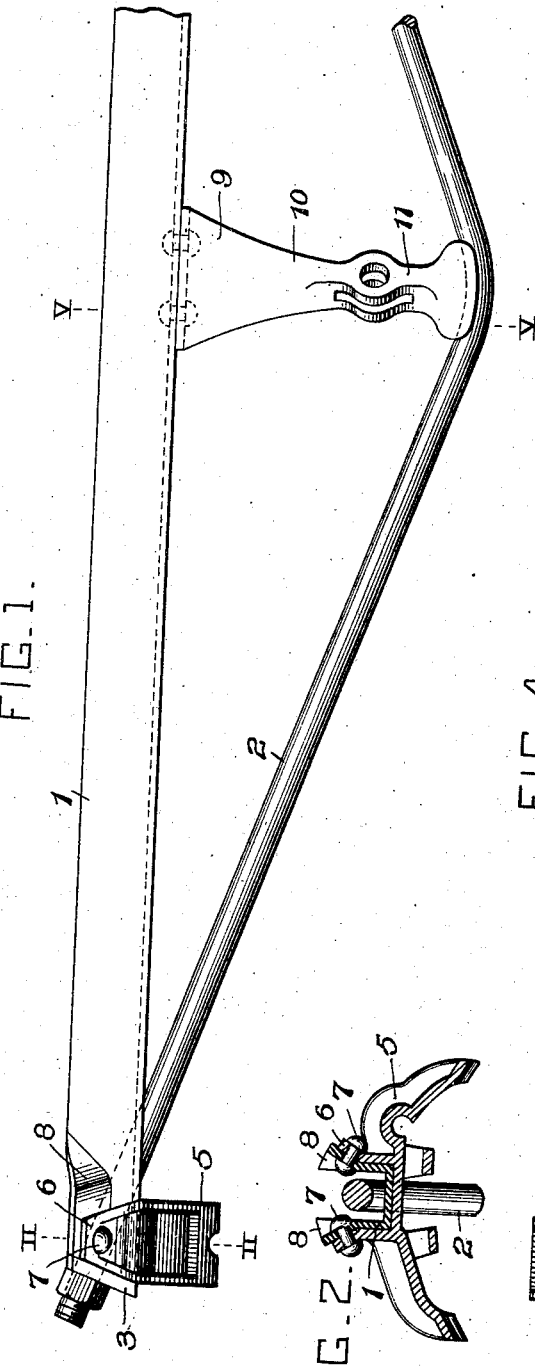
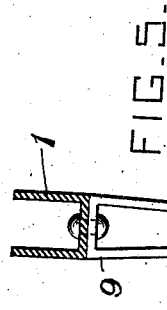
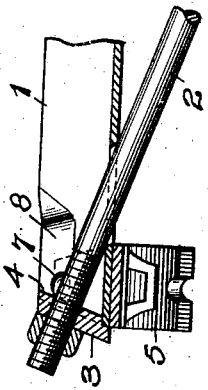
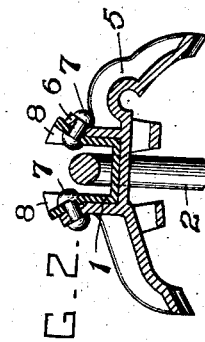
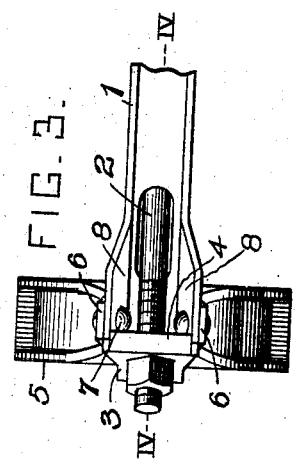
WITNESSES:
J. Herbert Bradley.
Charles Barnett.
James H. Baker INVENTOR
by Christy and Christy,
Atty's

UNITED STATES PATENT OFFICE.

JAMES H. BAKER, OF ALLEGHENY, PENNSYLVANIA.

BRAKE-BEAM.

No. 850,335. Specification of Letters Patent. Patented April 16, 1907.

Application filed July 16, 1906. Serial No. 326,435.

*To all whom it may concern:*

Be it known that I, JAMES H. BAKER, residing at Allegheny, in the county of Allegheny and State of Pennsylvania, a citizen of the United States, have invented or discovered certain new and useful Improvements in Brake-Beams, of which improvements the following is a specification.

The invention described herein relates to certain improvements in brake-beams for railway-cars, and has for its object such a construction and combination of parts as will permit of the renewal of brake-shoe heads or of the tension member without disturbing other parts of the beam.

The invention is hereinafter more fully described and claimed.

In the accompanying drawings, forming a part of this specification, Figure 1 is a plan view of a portion of my improved brake-beam. Fig. 2 is a sectional view on a plane indicated by the line II II, Fig. 1. Fig. 3 shows one end of the beam in side elevation. Fig. 4 is a sectional view on a plane indicated by the line IV IV, Fig. 3; and Fig. 5 is a sectional view on a plane indicated by the line V V, Fig. 1.

In the practice of my invention the beam is made in the form of a truss, having its compression member 1 formed of a channel shape. The channel is preferably formed by longitudinally bending a plate or rolled bar. The anchors for the ends of the tension member 2 are formed by caps or end pieces 3, preferably produced by drop-forging. The caps are formed on one side with projections or transverse enlargements 4, which fit within the channel and afford supports for the legs of the channel as against any collapsing when in use. It will be observed that the ends of the channel or compressing member are inclined, so as to be in planes at right angles to the tension member. It will be observed also that the compression member or channel is so arranged with reference to the other parts of the beam that the web thereof will be on the side of the beam toward the other parts. By thus arranging the compression member with reference to the other parts the web forms a seat for the strut and also forms stops or abutments adapted to prevent the transverse movements of the caps on the ends of the channel when the tension member is placed under tension. By thus constructing the ends of the compression member any liability of displacement of the caps either when segregating the parts of the beam or during the use of the latter is avoided. Any change of position of the cap is also prevented by the projection of a portion of the latter into the channel, as heretofore stated.

The shoe-head 5 is provided with ears or lugs 6, which pass on opposite sides of the channel and are secured thereto by bolts or rivets 7. It will be observed that the ends of the ears 6 and portions 8 of the legs of the channel or compression member are so bent outwardly that the rivets or bolts securing the heads to the compression member can be inserted and removed without disturbing any other parts of the beam.

The strut has its portion adjacent to the compression member box-shaped, the web or base 9 being connected by tapering side pieces or legs 10 to the head 11, so as to give the strut a broad bearing on the compression member, to which it is secured by bolts or rivets passing through the base on the box and the web of the compression member.

It is characteristic of my improvement that the shoe-heads do not have to be made right and lefts, but can be secured to either end of the brake-beam. It is further characteristic of the invention that the shoe-heads can be easily renewed without affecting the relations of the tension and compression members.

It will be observed that the compression member is of such a shape or contour as to permit of the making of the members differing considerably in thickness or gage and still preserving the external dimensions, so that the fittings—as shoe-heads, struts, and tension members—of the same or standard dimensions can be used with beams varying greatly in strength.

As the space allowed for inside-hung brake-beams is limited, the latter have to be made narrow. When made narrow, the position of the tension member will prevent the riveting or bolting of the shoe-heads to a channel compression member if the sides or legs of the latter are made parallel; but if said sides or legs or a portion thereof be bent outwardly, so that lines coinciding with the centers of the holes for the rivets or bolts for securing the heads in position will pass outside of the portions of the tension member inside of the channel, the rivets or bolts can be inserted without trouble, as shown in Fig. 2.

I claim herein as my invention—

1. A brake-beam having in combination a compression member having a channel shape, portions of the legs of said shape being bent outwardly, a tension member and a brake-shoe head provided with ears or lugs having their end portions bent outwardly.

2. A brake-beam having in combination a compression member having a channel shape, a brake-shoe head arranged on the web side of the channel, the legs of the channel having portions in planes forming angles greater than right angles with the web, and the shoe-head provided with ears or lugs fitting the sides or legs of the channel.

3. A brake-beam having in combination therewith a compression member, having a channel shape, a tension member, passing through the web of the compression member at an angle to the axis of the latter, portions of the legs of the compression member adjacent to the ends being bent outwardly to such an angle that the rivets or bolts for securing the brake-shoe head to the compression member may be passed to position above the tension member while the latter is in position.

In testimony whereof I have hereunto set my hand.

JAMES H. BAKER.

Witnesses:
   CHARLES BARNETT,
   J. HERBERT BRADLEY.